UNITED STATES PATENT OFFICE 2,676,952

FIBER SPINNING COMPOSITION

George E. Ham, Dayton, Ohio, assignor, by mesne assignments, to The Chemstrand Corporation, a corporation of Delaware No Drawing. Application October 22, 1949,
Serial No. 123,094

10 Claims. (Cl. 260—85.5)

This invention relates to new compositions of matter useful in the spinning of synthetic fibers, and to methods for their preparation. More specifically the invention relates to a modified copolymer of acrylonitrile and any of the vinyl substituted pyridines, which modified copolymers have valuable properties as are hereinafter described.

It is known that polyacrylonitrile and copolymers of substantial proportions of acrylonitrile and minor proportions of other polymerizable olefinic monomers are useful fiber forming resins. In general these polymers are not sufficiently dye receptive to be useful in the production of general purpose synthetic fiber. It has been suggested that by the proper selection of the comonomer acrylonitrile copolymers may be improved with respect to dye receptivity. For this purpose it has been proposed to use a basic monomer, for example one of the several well known vinyl pyridines, and in this manner synthetic fibers capable of being dyed by conventional procedures may be produced. The copolymers of acrylonitrile and the vinyl pyridines, however, are still less receptive of dyes than many of the natural fibers, or other synthetic fibers.

The primary purpose of this invention is to provide a means of improving the dye receptivity of copolymers of acrylonitrile and the tertiary amino vinyl monomers. A further purpose of this invention is to provide new resinous compositions useful in the fabrication of fibers. A still further purpose of this invention is to provide a new general purpose synthetic fiber capable of being dyed by conventional procedures.

In accordance with this invention it has been found that copolymers of 85 to 99 percent by weight of acrylonitrile and from one to 15 percent of a monomer, such as vinyl pyridine may be improved with respect to dye receptivity by reacting the polymer with an alkyl halide, by which means the tertiary amino group is converted to a quaternary ammonium salt. The copolymer so produced has a substantially greater dye affinity than the unmodified copolymers. A preferred class of modified copolymers are the copolymers of 90 to 97 percent acrylonitrile and three to ten percent of the vinyl pyridines which have been reacted with alkyl halides. By using this preferred class of composition excellent dye receptivity and optimum fiber properties can be achieved.

Suitable comonomers for the preparation of the acrylonitrile intermediate copolymers are 2-vinyl pyridine, 2-vinyl-5-ethyl pyridine, 4-vinyl pyridine, the methyl vinyl pyridines, the ethyl vinyl pyridines and other pyridines having a single vinyl group with or without substituted alkyl groups, 4-vinyl quinoline, 2-vinyl quinoline, $\beta$-dimethylaminoethyl methacrylate, diethylaminoethyl acrylate, vinyl benzoxazole, vinyl pyrazine, allyl dimethylaminoacetate, allyl diethylaminoethyl propionate and other tertiary amino compounds containing a single polymerizable vinyl group.

The intermediate copolymers which are modified in accordance with this invention may be prepared in an aqueous medium in the presence of a dispersing medium, such as an alkali metal salt of an aromatic sulfonic acid. Suitable dispersing agents are the sodium salts of formaldehyde condensed mononaphthalene sulfonic acids, and other water soluble salts of aldehyde condensed alkylaryl or aryl sulfonic acids. Although any water soluble salt is useful as a dispersing agent, sodium salts are preferred. The dispersing agent may be used in proportions from 0.05 to 0.50 percent based on the weight of the monomer to be charged, and the optimum concentration is between 0.08 and 0.15 weight percent. The stabilizer may be charged to the polymerization reactor at the beginning of the reaction or it may be added continuously or periodically throughout the course of the reaction in order to achieve the desired concentration in the reaction mass.

The reaction may be catalyzed by means of an alkali metal persulfate, which is used to the extent of 0.5 to two percent by weight of the monomer to be polymerized. The optimum catalyst concentration is from 0.8 to 1.5 percent, when the conditions of reaction are such as to utilize the catalyst efficiently. The reaction may be conducted by adding the catalyst to the aqueous medium prior to the introduction of monomer, but preferred operation utilizes a continuous or periodic addition of the catalyst so as to maintain an approximately uniform concentration in the reaction mass throughout the course of the reaction.

The method, if desired, may utilize a conventional molecular weight regulator, for example t-dodecylmercaptan and carbon tetrachloride, which may be added at the beginning of the reaction or during the reaction. Preferred operation utilizes a small concentration of catalyst, dispersing agent, and if desired, the regulator in the aqueous medium at the beginning of the reaction. The additional catalyst, dispersing agent, and regulator are added continuously throughout the reaction by means of a suitable metering device for adding the agents at a uniform pre-determined rate. The reaction is conducted at a temperature between 65° C. and 90° C. and is coordinated so that the reaction will be substantially completed when all of the desired lot of monomers have been added to the reaction mass. The rate of addition is fixed so that it will be completed within a desirable short reaction period, for example one to four hours. The reaction is controlled by the rate of addition of the monomer and the temperature is preferably the reflux temperature for the reaction mass. Under such conditions slight fluctuations of the temperature of reflux may occur as the reaction proceeds.

The preferred method of preparing the copolymer is described and claimed in copending application Serial No. 111,574, filed August 20, 1949, by Costas H. Basdekis and George L. Wesp, now United States Patent No. 2,635,091.

The copolymers of acrylonitrile and the tertiary amino vinyl monomers are in accordance with this invention modified by treatment with an organic halide wherein the halogen atom is attached to an aliphatic carbon atom. Although any alkyl halide of the group consisting of bromides, iodides and chlorides may be used in the practice of this invention the more volatile compositions of lower molecular weight, such as methyl chloride, ethyl bromide and isopropyl chloride are more difficult to handle and require expensive pressurized equipment. Similarly, the high molecular weight materials which are solids at room temperature, for example octadecyl chloride, lauryl bromide and hexadecyl iodide, are not preferred because of the necessity of dispersing the polymer in solvents for both reactants. Accordingly, the alkyl halides of intermediate molecule size, such as butyl bromide, n-butyl chloride, isobutyl chloride, t-butyl chloride, the amyl chlorides, the alkyl esters of chloroaliphatic acids, for example ethyl chloroacetate, benzyl chloride, butyl iodide, and octyl bromide are preferred. The optimum halides for use in the practice of this invention are the butyl and amyl bromides and chlorides, which compounds have a very useful combination of desirable properties, for example they are liquids at room temperatures, have relatively low vapor pressures and are of excellent reactivity.

The copolymers of acrylonitrile and the tertiary amino vinyl monomer may be treated with the alkyl halide while in the solid, granular state, as obtained by filtration of the polymerization reaction dispersion. If desired, the polymer may be dissolved in a suitable solvent, for example, N,N-dimethylacetamide, N,N-dimethylformamide, N,N-dimethylmethoxyacetamide, γ-butyrolactone, ethylene carbonate and α-cyanoacetamide. Furthermore, the reaction may be effected after the fibers have been spun from the copolymers of acrylonitrile and vinyl pyridine. Obviously, in the first and last of these expedients, a smaller proportion of the tertiary amino groups will be converted to the quaternary ammonium groups. Since penetration of the solid structures by the alkyl halide is more difficult, the preferred procedure is that involving the treatment of the polymer in a solvent for acrylonitrile copolymers, by which method it is possible to attain more rapid and more nearly complete reaction of the tertiary amino groups with the alkyl halides.

Through the practice of this invention exceptional dye receptivity is attained for synthetic fibers, which activity with respect to dyes compares favorably with wool and other natural fibers. The copolymers prepared in accordance with this invention are capable of being dyed by any of a wide variety of acid type dyestuffs. Accordingly, through the practice of this invention a relatively inferior fiber with respect to dye absorption can be conveniently converted into a polymer or fiber of excellent dye receptivity. Furthermore, through the practice of this invention dyeable copolymers of acrylonitrile can be prepared with a higher proportion of acrylonitrile than is possible from copolymers of acrylonitrile and the vinyl substituted tertiary amino compounds. Thus, dyeable copolymers can be prepared without a substantial sacrifice of fiber forming properties.

Further details of the practice of this invention are set forth with respect to the following specific examples:

*Example 1*

A copolymer of 95 percent by weight of acrylonitrile and five percent of 2-vinyl pyridine was prepared by polymerization in an aqueous suspension. Fifteen parts of the copolymer was dispersed in 85 parts of dimethylacetamide and the mixture stirred until complete homogeneous solution was obtained. The solution was then charged with two parts of n-butylbromide and heated to 80° C. for eight hours. Synthetic fibers were spun by extruding the solution through a spinneret into a mixture of 67 percent water and 33 per cent dimethylacetamide. A sample of one gram of the fiber was dyed with "Wool Fast Scarlet" in a bath containing originally 0.02 gram Wool Fast Scarlet G. Supra, five cc. of three percent sulfuric acid, and 40 ccs. of water. The fiber was in contact with the dye bath for one hour at 95° C. The fiber absorbed 96 percent of the dye from the bath.

In a control experiment utilizing the fiber of a copolymer of 95 percent acrylonitrile and five percent vinyl pyridine which had not been treated with butyl bromide, only 24 percent of the dye in the bath was absorbed by the fiber.

The dyed fiber of 95 percent acrylonitrile and five percent 2-vinyl pyridine which had been reacted with butyl bromide was a brilliant, intense red color, whereas a polymer of 94 percent acrylonitrile and six percent of 2-vinyl pyridine without alkyl halide treatment was found to absorb dye to an extent insufficient for satisfactory industrial operation, only a pale red coloration being achieved.

The invention is defined by the following claims.

I claim:

1. A method of preparing a fiber-forming copolymer having dye-receptivity comparable to that of natural wool fibers, of 85 to 99% by weight of acrylonitrile and 1 to 15% by weight of a teritary amino compound containing a polymerizable vinyl substituent, which comprises dissolving the copolymer in an organic solvent therefor and chemically reacting the copolymer in said solution with a normally liquid alkyl halide of the group consisting of bromides, chlorides, and iodides to convert substantially all of the tertiary amino groups of said copolymer into quaternary ammonium salts.

2. The method as defined in claim 1 wherein the tertiary amino compound is a pyridine containing a substituted vinyl group.

3. The method as defined in claim 1 wherein the tertiary amino compound is 2-vinylpyridine.

4. The method as defined in claim 1 wherein the tertiary amino compound is 4-vinylpyridine.

5. The method as defined in claim 1 wherein the tertiary amino compound is an alkyl substituted vinylpyridine.

6. The method as defined in claim 1 wherein the tertiary amino compound is 5-ethyl-2-vinylpyridine.

7. A method of preparing a fiber-forming copolymer having dye-receptivity comparable to that of natural wool fibers, of 90 to 97% by weight of acrylonitrile and 3 to 10% by weight of a tertiary amino compound containing a polymerizable vinyl substituent, which comprises dissolving the copolymer in an organic solvent therefor and chemically reacting the copolymer in said solution with a normally liquid alkyl halide of the group consisting of bromides, chlorides, and iodides to convert substantially all of the tertiary amino groups of said copolymer into quaternary ammonium salts.

8. The method as defined in claim 7 wherein the tertiary amino compound is 2-vinylpyridine and the alkyl halide is butyl chloride.

9. The method as defined in claim 7 wherein the tertiary amino compound is 4-vinylpyridine and the alkyl halide is butyl chloride.

10. The method as defined in claim 7 wherein the tertiary amino compound is an alkyl substituted vinylpyridine and the alkyl halide is butyl chloride.

References Cited in the file of this patent

UNITED STATES PATENTS

| Number | Name | Date |
|---|---|---|
| 2,131,146 | Schlack | Sept. 27, 1938 |
| 2,138,763 | Graves | Nov. 29, 1938 |
| 2,491,471 | Arnold | Dec. 20, 1949 |

FOREIGN PATENTS

| Number | Country | Date |
|---|---|---|
| 586,881 | Great Britain | Apr. 3, 1947 |